(12) United States Patent
Ryu et al.

(10) Patent No.: US 10,443,514 B2
(45) Date of Patent: *Oct. 15, 2019

(54) METHOD FOR CONTROLLING OF VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 70 days.

This patent is subject to a terminal disclaimer.

(21) Appl. No.: 15/258,043

(22) Filed: Sep. 7, 2016

(65) Prior Publication Data

US 2017/0167402 A1    Jun. 15, 2017

(30) Foreign Application Priority Data

Dec. 11, 2015    (KR) .................. 10-2015-0176786

(51) Int. Cl.
*F02D 13/02*    (2006.01)
*F02D 13/04*    (2006.01)
(Continued)

(52) U.S. Cl.
CPC ......... *F02D 13/0215* (2013.01); *B60W 10/06* (2013.01); *B60W 20/10* (2013.01);
(Continued)

(58) Field of Classification Search
CPC ............. F02D 13/0215; F02D 13/0261; F02D 41/0002; F02D 41/1498; F02D 41/0235;
(Continued)

(56) References Cited

U.S. PATENT DOCUMENTS 3,633,555 A    1/1972 Raggi
4,552,112 A    11/1985 Nagao et al.
(Continued)

FOREIGN PATENT DOCUMENTS

JP    H07-42514 A    2/1995
JP    H 07-324610 A    12/1995
(Continued)

OTHER PUBLICATIONS

Notice of Allowance dated May 16, 2018 from the corresponding U.S. Appl. No. 15/340,742, 52 pages.
(Continued)

*Primary Examiner* — Hung Q Nguyen
*Assistant Examiner* — Brian P Monahon
(74) *Attorney, Agent, or Firm* — Brinks Gilson & Lione

(57) ABSTRACT

The method for controlling valve timing for a turbo engine includes: classifying control regions depending on an engine speed and an engine load; applying a maximum duration to an intake valve and applying a long duration to an exhaust valve in a first control region; applying the maximum duration to the intake and applying the long duration to the exhaust valve in a second control region; applying the long duration to the exhaust valve and advancing an intake valve closing (IVC) timing in the third control region; applying a short duration to the exhaust valve and controlling the IVC timing in the fourth control region; controlling a wide open throttle valve (WOT) and applying the short duration to the exhaust valve in the fifth control region; controlling a WOT and controlling the IVC timing by applying the long duration to the exhaust valve in the sixth control region.

16 Claims, 4 Drawing Sheets

US 10,443,514 B2
Page 2

(51) Int. Cl.
*F02D 41/00* (2006.01)
*F02D 41/02* (2006.01)
*F02D 41/14* (2006.01)
*F02D 41/26* (2006.01)
*B60W 10/06* (2006.01)
*B60W 20/10* (2016.01)
*F01L 1/047* (2006.01)
*F01L 1/053* (2006.01)
*F01L 1/34* (2006.01)
*F01L 13/00* (2006.01)
*F01L 1/344* (2006.01)

(52) U.S. Cl.
CPC .............. *F01L 1/047* (2013.01); *F01L 1/053* (2013.01); *F02D 13/0261* (2013.01); *F02D 41/0002* (2013.01); *F02D 41/0235* (2013.01); *F02D 41/1498* (2013.01); *F02D 41/26* (2013.01); *F01L 1/34* (2013.01); *F01L 13/0015* (2013.01); *F01L 2001/0537* (2013.01); *F01L 2001/34496* (2013.01); *F01L 2800/00* (2013.01); *F02D 2041/002* (2013.01); *F02D 2200/101* (2013.01); *Y02T 10/18* (2013.01); *Y02T 10/42* (2013.01); *Y10S 903/905* (2013.01)

(58) Field of Classification Search
CPC .............. F02D 41/26; F02D 2041/002; F02D 2200/101; B60W 20/10; B60W 10/06; Y02T 10/42; Y02T 10/18; F01L 13/0015; F01L 1/053; F01L 1/047; F01L 2001/0537; F01L 2001/34496; F01L 2800/00; F01L 1/34; Y10S 903/905
See application file for complete search history.

(56) References Cited

U.S. PATENT DOCUMENTS

| | | | |
|---|---|---|---|
| 5,080,055 A * | 1/1992 | Komatsu | F01L 1/08 123/90.11 |
| 5,121,733 A | 6/1992 | Goto et al. | |
| 5,161,497 A | 11/1992 | Simko et al. | |
| 5,224,460 A | 7/1993 | Havstad et al. | |
| 5,419,301 A | 5/1995 | Schechter | |
| 5,421,308 A | 6/1995 | Hitomi et al. | |
| 5,429,100 A | 7/1995 | Goto et al. | |
| 5,450,824 A | 9/1995 | Yamane et al. | |
| 5,469,818 A | 11/1995 | Yoshioka et al. | |
| 5,553,573 A | 9/1996 | Hara et al. | |
| 5,622,144 A * | 4/1997 | Nakamura | F01L 1/34406 123/90.15 |
| 5,687,681 A | 11/1997 | Hara | |
| 5,698,779 A * | 12/1997 | Yoshioka | F02D 13/0215 73/114.32 |
| 5,778,840 A | 7/1998 | Murata et al. | |
| 5,809,955 A | 9/1998 | Murata et al. | |
| 5,924,334 A | 7/1999 | Hara et al. | |
| 5,992,361 A | 11/1999 | Murata et al. | |
| 6,006,707 A | 12/1999 | Ito | |
| 6,318,343 B1 | 11/2001 | Nakagawa et al. | |
| 6,336,436 B1 | 1/2002 | Miyakubo et al. | |
| 6,553,949 B1 * | 4/2003 | Kolmanovsky | F02B 75/045 123/406.21 |
| 6,619,242 B2 | 9/2003 | Kaneko | |
| 6,837,199 B2 | 1/2005 | Matsuura et al. | |
| 7,793,625 B2 | 9/2010 | Nakamura et al. | |
| 7,823,550 B2 | 11/2010 | Murata | |
| 8,205,587 B2 | 6/2012 | Murata et al. | |
| 8,235,015 B2 | 8/2012 | Murata | |
| 8,677,957 B2 | 3/2014 | Goto et al. | |
| 8,887,691 B2 | 11/2014 | Chen et al. | |
| 9,863,331 B2 | 1/2018 | Ryu et al. | |
| 9,863,340 B2 | 1/2018 | Ryu et al. | |
| 9,874,153 B2 | 1/2018 | Ryu et al. | |
| 9,874,154 B2 | 1/2018 | Ryu et al. | |
| 9,879,619 B2 | 1/2018 | Ryu et al. | |
| 9,889,838 B2 | 2/2018 | Ryu et al. | |
| 9,903,281 B2 | 2/2018 | Ryu et al. | |
| 9,932,883 B2 | 4/2018 | Iwai et al. | |
| 9,932,908 B2 | 4/2018 | Ryu et al. | |
| 9,964,050 B2 | 5/2018 | Ryu et al. | |
| 10,006,378 B2 | 6/2018 | Ryu et al. | |
| 2001/0025615 A1 * | 10/2001 | Nohara | F01L 13/0021 123/90.15 |
| 2001/0032605 A1 | 10/2001 | Kadowaki | |
| 2001/0050067 A1 * | 12/2001 | Sato | F01L 1/34 123/90.17 |
| 2002/0043243 A1 | 4/2002 | Majima | |
| 2003/0131805 A1 | 7/2003 | Yang | |
| 2004/0099244 A1 | 5/2004 | Matsuura et al. | |
| 2005/0205069 A1 | 9/2005 | Lewis et al. | |
| 2005/0235933 A1 | 10/2005 | Arai et al. | |
| 2006/0037571 A1 | 2/2006 | Machida | |
| 2006/0266311 A1 | 11/2006 | Fujii | |
| 2007/0181096 A1 | 8/2007 | Wagner et al. | |
| 2007/0272202 A1 * | 11/2007 | Kuo | F02D 13/0211 123/295 |
| 2008/0029050 A1 | 2/2008 | Ichmura et al. | |
| 2008/0300773 A1 | 12/2008 | Winstead | |
| 2008/0308053 A1 | 12/2008 | Tsuchida | |
| 2009/0007564 A1 | 1/2009 | Suzuki et al. | |
| 2009/0007867 A1 | 1/2009 | Tanabe et al. | |
| 2009/0031973 A1 * | 2/2009 | Murata | F02D 13/0238 123/90.16 |
| 2009/0241877 A1 | 10/2009 | Hoshikawa | |
| 2009/0272363 A1 * | 11/2009 | Yun | F02B 1/12 123/295 |
| 2009/0277434 A1 | 11/2009 | Surnilla | |
| 2010/0023242 A1 | 1/2010 | Kawamura | |
| 2010/0217504 A1 | 8/2010 | Fujii et al. | |
| 2012/0000197 A1 * | 1/2012 | Maruyama | F02D 41/0057 60/605.2 |
| 2012/0004826 A1 * | 1/2012 | Shimo | F02D 41/3035 701/103 |
| 2013/0146006 A1 | 6/2013 | Kim et al. | |
| 2013/0146037 A1 | 6/2013 | Han et al. | |
| 2013/0206104 A1 * | 8/2013 | Kuhlmeyer | F02D 13/0207 123/348 |
| 2013/0213332 A1 | 8/2013 | Yano et al. | |
| 2013/0276731 A1 | 10/2013 | Yano et al. | |
| 2014/0165963 A1 | 6/2014 | Langham | |
| 2015/0034052 A1 | 2/2015 | Shimizu | |
| 2015/0114342 A1 * | 4/2015 | Iwai | F02M 26/25 123/305 |
| 2015/0167508 A1 | 6/2015 | Ha | |
| 2015/0167509 A1 | 6/2015 | Ha | |
| 2016/0090877 A1 | 3/2016 | Kim et al. | |
| 2017/0082036 A1 | 3/2017 | Kwon et al. | |
| 2017/0082037 A1 | 3/2017 | Ryu et al. | |
| 2017/0089230 A1 | 3/2017 | Son et al. | |
| 2017/0114680 A1 | 4/2017 | Kim | |
| 2017/0167318 A1 | 6/2017 | Ryu et al. | |
| 2017/0167323 A1 | 6/2017 | Son et al. | |
| 2017/0167393 A1 | 6/2017 | Ryu et al. | |
| 2017/0167394 A1 | 6/2017 | Ryu et al. | |
| 2017/0167396 A1 | 6/2017 | Ryu et al. | |
| 2017/0167398 A1 | 6/2017 | Ryu et al. | |
| 2017/0167399 A1 | 6/2017 | Ryu et al. | |
| 2017/0167400 A1 | 6/2017 | Ryu et al. | |
| 2017/0167401 A1 | 6/2017 | Ryu et al. | |
| 2017/0167402 A1 | 6/2017 | Ryu et al. | |
| 2017/0167403 A1 | 6/2017 | Ryu et al. | |
| 2017/0167404 A1 | 6/2017 | Ryu et al. | |
| 2017/0167405 A1 | 6/2017 | Ryu et al. | |
| 2017/0167406 A1 | 6/2017 | Ryu et al. | |
| 2017/0167407 A1 | 6/2017 | Ryu et al. | |
| 2017/0167408 A1 | 6/2017 | Ryu et al. | |
| 2017/0167409 A1 | 6/2017 | Ryu et al. | |
| 2017/0167414 A1 | 6/2017 | Ryu et al. | |
| 2017/0234243 A1 | 8/2017 | Ryu et al. | |

(56) References Cited

U.S. PATENT DOCUMENTS

| | | |
|---|---|---|
| 2017/0268435 A1 | 9/2017 | Ryu et al. |
| 2017/0268436 A1 | 9/2017 | Ryu et al. |
| 2017/0268437 A1 | 9/2017 | Ryu et al. |
| 2017/0284235 A1 | 10/2017 | Son et al. |
| 2017/0284238 A1 | 10/2017 | Son et al. |
| 2018/0073455 A1 | 3/2018 | Barra |
| 2018/0100444 A1 | 4/2018 | Ryu et al. |
| 2018/0100445 A1 | 4/2018 | Ryu et al. |
| 2018/0100446 A1 | 4/2018 | Ryu et al. |
| 2018/0100447 A1 | 4/2018 | Ryu et al. |
| 2018/0100448 A1 | 4/2018 | Ryu et al. |
| 2018/0100452 A1 | 4/2018 | Ryu et al. |
| 2018/0100453 A1 | 4/2018 | Ryu et al. |
| 2018/0100454 A1 | 4/2018 | Ryu et al. |

FOREIGN PATENT DOCUMENTS

| | | |
|---|---|---|
| JP | 2005-098150 | 4/2005 |
| JP | 2006-046293 A | 2/2006 |
| JP | 2010-216464 A | 9/2010 |

OTHER PUBLICATIONS

Non-Final Office Action dated Sep. 28, 2018 from the corresponding U.S. Appl. No. 15/839,606, 33 pages.
Non-Final Office Action dated Oct. 5, 2018 from the corresponding U.S. Appl. No. 15/839,626, 19 pages.
Non-Final Office Action dated Oct. 10, 2018 from the corresponding U.S. Appl. No. 15/839,596, 29 pages.
Non-Final Office Action dated Aug. 24, 2018 from the corresponding U.S. Appl. No. 15/840,079, 41 pages.
Final Office Action dated Sep. 6, 2018 from the corresponding U.S. Appl. No. 15/258,154, 15 pages.
Non-Final Office Action dated Sep. 7, 2018 from the corresponding U.S. Appl. No. 15/839,581, 15 pages.
Notice of Allowance dated Mar. 18, 2019 from the corresponding U.S. Appl. No. 15/839,581, 14 pages.
Final Office Action dated Mar. 18, 2019 from corresponding U.S. Appl. No. 15/840,079, 31 pages.
Extended European Search Report dated Mar. 4, 2019 from the corresponding European Application No. 18201117.1 (9 pages).
Final Office Action dated Apr. 11, 2019 from corresponding U.S. Appl. No. 15/839,606 (13 pages).
Non-Final Office Action dated Jul. 9, 2019 from the corresponding U.S. Appl. No. 15/839,624, 9 pages.

* cited by examiner

IVD map
(Unit : Crank angle)

IVO timing map
(Unit : Before TDC)

IVC timing map
(Unit : After BDC)

EVD map
(Unit : Crank angle)

EVO timing map
(Unit : Before BDC)

EVC timing map
(Unit : After TDC)

METHOD FOR CONTROLLING OF VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0176786, filed on Dec. 11, 2015, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) may be controlled according to a rotational speed or load of an engine. Therefore, a continuous variable valve duration (CVVD) device controlling the opening duration of an intake valve and an exhaust valve of the engine and a continuous variable valve timing (CVVT) device controlling the opening and closing timing of the intake valve and the exhaust valve of the engine have been developed.

The CVVD device may control opening duration of the valve. In addition, the CVVT device may advance or retard the opening or closing timing of the valve in a state that the opening duration of the valve is fixed. That is, if the opening timing of the valve is determined, the closing timing is automatically determined according to the opening duration of the valve.

The above information disclosed in this Background section is only for enhancement of understanding of the background of the present disclosure and therefore it may contain information that does not form the prior art that is already known to a person of ordinary skill in the art.

SUMMARY

The present disclosure provides a system and a method for controlling valve timing of a continuous variable valve duration engine that simultaneously controls duration and timing of the valve being equipped with a continuous variable valve duration device and a continuous variable valve timing device disposed on an intake valve side, and being equipped with a two-stage variable valve duration device and continuous variable valve timing device disposed on an exhaust valve side of a turbo engine vehicle.

A method for controlling valve timing of a turbo engine provided with a continuous variable valve duration (CVVD) device and a continuous variable valve timing (CVVT) device disposed on an intake valve side, and provided with a two-stage variable valve duration (VVD) device and continuous variable valve timing (CVVT) device disposed on an exhaust valve side may include classifying a plurality of control regions depending on an engine speed and an engine load. The plurality of control regions may include: a first control region when the engine load is less than a first predetermined load; a second control region when the engine load is greater than or equal to the first predetermined load and less than a second predetermined load; a third control region when the engine load is greater than or equal to the second predetermined load and less than a third predetermined load; a fourth control region when the engine load is greater than or equal to the second predetermined load and the engine speed is greater than or equal to a first predetermined speed and less than a second predetermined speed; a fifth control region when the engine load is greater than or equal to the third predetermined load and the engine speed is less than the first predetermined speed; and a sixth control region when the engine load is greater than or equal to the third predetermined load and the engine speed is greater than or equal to the second predetermined speed.

The method for controlling valve timing further includes: applying a maximum duration to the intake valve and applying a long duration to the exhaust valve to control a valve overlap between the exhaust valve and the intake valve in the first control region; applying the maximum duration to the intake and applying the long duration to the exhaust valve in order to control the control overlap according to an engine load in the second control region; applying the long duration to the exhaust valve and advancing an intake valve closing (IVC) timing in the third control region; applying a short duration to the exhaust valve and controlling the intake valve closing (IVC) timing close to a bottom dead center in the fourth control region; controlling a wide open throttle valve (WOT) and applying the short duration to the exhaust valve to generate scavenging in the fifth control region; controlling a wide open throttle valve (WOT) and controlling the intake valve closing (IVC) timing by applying the long duration to the exhaust valve so as to reduce a knocking in the sixth control region.

If the control region is in the first control region, then the controller may control an intake valve opening (IVO) timing, the intake valve closing (IVC) timing, and an exhaust valve opening (EVO) to be fixed and an exhaust valve closing (EVC) timing to be set up at a maximum value within sustainable combustion stability.

If the control region is in the second control region, then the controller may control an exhaust valve closing (EVC) timing to be retard as the engine load is increased in order to increase the valve overlap, and after when the engine load is greater than or equal to a predetermined load, the controller may control the exhaust valve closing (EVC) timing to be advanced in order to decrease the valve overlap.

If the control region is in the third control region, then the controller may advance the intake valve closing (IVC) timing close to a bottom dead center when the engine speed is less than a predetermined speed, the controller may advance the intake valve closing (IVC) timing to after the bottom dead center when the engine speed is greater than or equal to the predetermined speed.

If the control region is in the fourth control region, then the controller may control an intake valve opening (IVO) timing and an exhaust valve closing (EVC) timing to approach at a top dead center in order to reduce the valve overlap.

If the control region is in the fifth control region, then the controller may advance an intake valve opening (IVO) timing to before a top dead center to generate the scavenging and control the intake valve closing (IVC) timing to after a bottom dead center.

If the control region is in the fifth control region, then the controller may advance an intake valve opening (IVO) timing to before a top dead center to generate the scavenging and controls the intake valve closing (IVC) timing to after a bottom dead center.

If the control region is in the sixth control region, then the controller may advance an exhaust valve opening (EVO) timing to before a bottom dead center to inhibit or prevent an exhaust pumping and to lower boost pressure, and the controller controls an exhaust valve closing (EVC) timing to be close to a top dead center.

A system for controlling valve timing of a continuous variable valve duration engine provided with a turbo charger may include a data detector detecting data related to a running state of the vehicle; a camshaft position sensor detecting a position of a camshaft; an intake continuous variable valve duration (CVVD) device controlling an opening time of an intake valve of the engine; an exhaust two-stage variable valve duration (VVD) device controlling an opening time of the exhaust valve of the engine; an intake continuous variable valve timing (CVVT) device controlling an opening and closing timing of the intake valve of the engine; an exhaust continuous variable valve timing (CVVT) device controlling an opening and closing timing of the exhaust valve of the engine; and a controller configured to classify a plurality of control regions depending on an engine speed and an engine load based on signals from the data detector and camshaft position sensor, and configured to control the intake CVVD and CVVT devices, and the exhaust two-stage VVD and CVVT devices according to the control regions, and the a plurality of control regions may include a first control region when the engine load is less than a first predetermined load; a second control region when the engine load is greater than or equal to the first predetermined load and less than a second predetermined load; a third control region when the engine load is greater than or equal to the second predetermined load and less than a third predetermined load; a fourth region when the engine load is greater than or equal to the second predetermined load and the engine speed is greater than or equal to a first predetermined speed and less than a second predetermined speed; a fifth region when the engine load is greater than or equal to the third predetermined load and the engine speed is less than the first predetermined speed; and a sixth region when the engine load is greater than or equal to the third predetermined load and the engine speed is greater than or equal to the second predetermined speed.

The controller may apply a maximum duration to the intake valve and apply the long duration to the exhaust valve to limit a valve overlap in the first control region, apply the maximum duration to the intake and apply the long duration to the exhaust valves in order to control the control overlap according to the engine load in the second control region, apply the long duration to the exhaust valve and advances an intake valve closing (IVC) timing in the third control region, apply the short duration to the exhaust valve and controls the intake valve closing (IVC) timing close to a bottom dead center in the fourth control region, control a wide open throttle valve (WOT) and apply the short duration to the exhaust valve to generate scavenging in the fifth control region, and control a wide open throttle valve (WOT) and control the intake valve closing (IVC) timing by applying the long duration to the exhaust valve to reduce knocking in the sixth control region.

The controller may control an intake valve opening (IVO) timing, the intake valve closing (IVC) timing, and an exhaust valve opening (EVO) to be fixed and an exhaust valve closing (EVC) timing to be set up at a maximum value within sustainable combustion stability in the first region.

The controller may control an exhaust valve closing (EVC) timing to be retard as the engine load is increased in order to increase the valve overlap, when the engine load is greater than or equal to a predetermined load, the controller may control the exhaust valve closing (EVC) timing to be advanced in order to decrease the valve overlap in the second control region.

The controller may advance the intake valve closing (IVC) timing to be close to a bottom dead center when the engine speed is less than a predetermined speed, the controller may advance the intake valve closing (IVC) timing to after the bottom dead center when the engine speed is greater than or equal to the predetermined speed in the third control region.

The controller may control an intake valve opening (IVO) timing and an exhaust valve closing (EVC) timing to approach at a top dead center in order to reduce the valve overlap in the fourth control region.

The controller may advance an intake valve opening (IVO) timing to before a top dead center to generate the scavenging and controls the intake valve closing (IVC) timing to after a bottom dead center in the fifth control region.

The controller may retard an exhaust valve opening (EVO) timing to after a bottom dead center so as to reduce interference of exhaust and control an exhaust valve closing (EVC) timing to after a top dead center to maintain catalyst temperature in the fifth control region.

The controller may advance an exhaust valve opening (EVO) timing to before a bottom dead center to inhibit or prevent an exhaust pumping and to lower boost pressure, and the controller controls an exhaust valve closing (EVC) timing to be close to a top dead center in the sixth control region.

As described above, duration and timing of the continuous variable valve are simultaneously controlled, so the engine may be controlled under desirable conditions.

That is, since opening timing and closing timing of the intake valve and the exhaust valve are appropriately controlled, the fuel efficiency under a partial load condition and engine performance under a high load condition are improved. In addition, a starting fuel amount may be reduced by increasing a valid compression ratio, and exhaust gas may be reduced by shortening time for heating a catalyst.

In addition, the cost reduction and power performance may be realized by providing the two-stage VVD device to the exhaust valve side.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, references being made to the accompanying drawings, in which.

Figure 1:
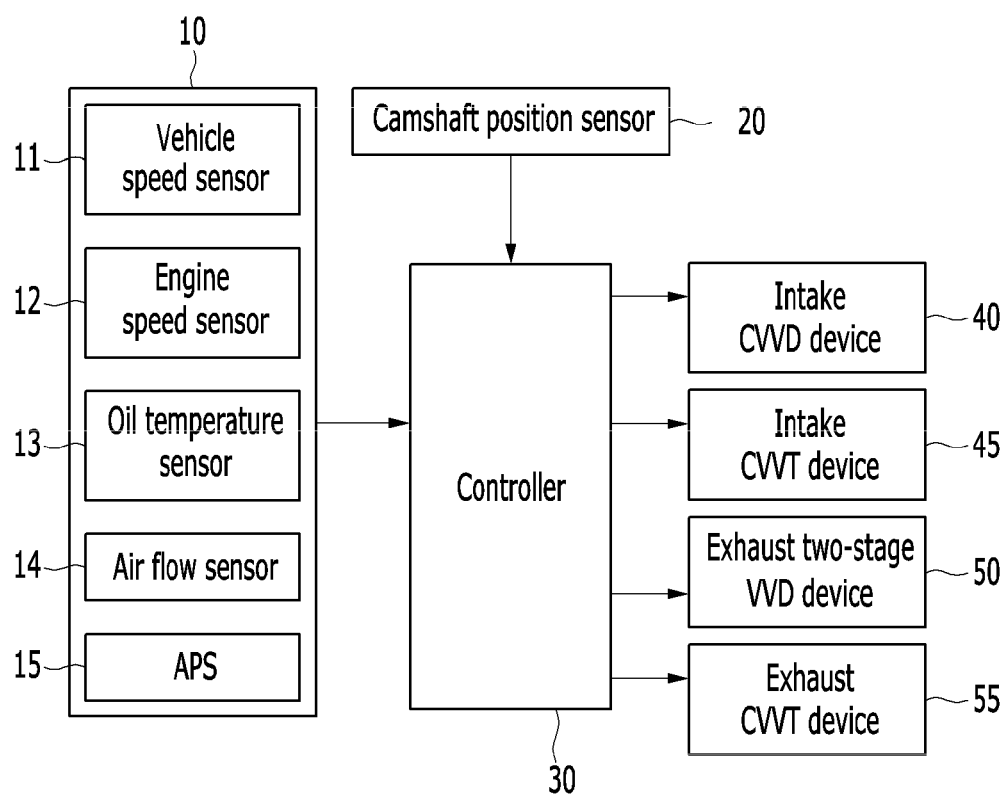
FIG. 1 is a schematic block diagram showing a system for controlling valve timing of a continuous variable valve duration engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to one form of the present disclosure.

An engine according one form of the present disclosure may be a turbo engine provided with a turbocharger.

As shown in FIG. 1, a system for controlling valve timing of a continuous variable valve duration engine includes: a data detector 10, a camshaft position sensor 20, a controller 30, an intake continuous variable valve duration (CVVD) device 40, an intake continuous variable valve timing (CVVT) device 45, an exhaust two-stage variable valve duration device 50, and an exhaust continuous variable valve timing (CVVT) device 55.

The data detector 10 detects data related to a running state of a vehicle for controlling the intake continuous variable valve duration (CVVD) device 40, the intake continuous variable valve timing (CVVT) device 45, the exhaust two-stage variable valve duration (VVD) device 50, and the exhaust continuous variable valve timing (CVVT) device 55. The data detector 10 includes: a vehicle speed sensor 11, an engine speed sensor 12, an oil temperature sensor 13, an air flow sensor 14, and an accelerator pedal position sensor (APS) 15, although other sensors may be employed.

The vehicle speed sensor 11 detects a vehicle speed, transmits a corresponding signal to the controller 30, and may be mounted at a wheel of the vehicle.

The engine speed sensor 12 detects a rotation speed of the engine from a change in phase of a crankshaft or camshaft, and transmits a corresponding signal to the controller 30.

The oil temperature sensor (OTS) 13 detects temperature of oil flowing through an oil control valve (OCV), and transmits a corresponding signal to the controller 30.

The oil temperature detected by the oil temperature sensor 13 may be determined by measuring a coolant temperature using a coolant temperature sensor mounted at a coolant passage of an intake manifold. Therefore, in one form, the oil temperature sensor 13 may include a coolant temperature sensor, and the oil temperature should be understood to include the coolant temperature.

The air flow sensor 14 detects an air amount drawn into the intake manifold, and transmits a corresponding signal to the controller 30.

The accelerator pedal position sensor (APS) 15 detects a degree in which a driver pushes an accelerator pedal, and transmits a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake passage may be used instead of the accelerator pedal position sensor 15. Therefore, in one form, the accelerator pedal position sensor 15 may include a throttle valve position sensor, and the position value of the accelerator pedal should be understood to include an opening value of the throttle valve.

The camshaft position sensor 20 detects a change of a camshaft angle, and transmits a corresponding signal to the controller 30.

Figure 2:
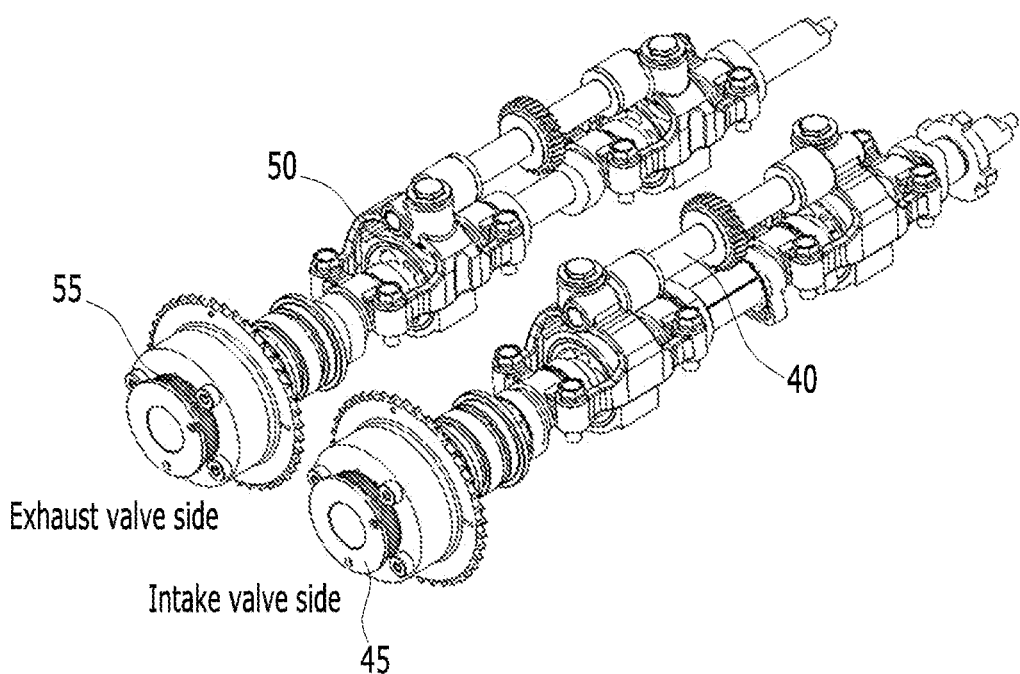
FIG. 2 is a perspective view showing a continuous variable valve duration device and a continuous variable valve timing device which are disposed on an intake valve side, and a two-stage variable valve duration device and continuous variable valve timing device which are disposed on an exhaust valve side.

FIG. 2 is a perspective view showing a continuous variable valve duration device and a continuous variable valve timing device which is disposed on an intake valve side, and a two-stage variable valve duration device and continuous variable valve timing device which is disposed on an exhaust valve side.

The intake continuous variable valve duration (CVVD) device 40 controls an opening time of an intake valve of the engine according to a signal from the controller 30, the exhaust continuous variable valve duration (CVVD) device 50 controls an opening time of an exhaust valve of the engine according to a signal from the controller 30.

The exhaust two-stage variable valve duration (VVD; Variable Valve Duration) device 50 may control an opening time of the exhaust valve of engine according to a signal from the controller 30 by switching the opening time to two stage. That is, the exhaust two-stage VVD device 50 may use a solenoid valve without a motor and a sensor which is provided to an exhaust CVVD, thereby the manufacturing cost may be reduced.

When exhaust duration is longer, the fuel efficiency and a high-speed performance may be improved, however a low-speed performance may be deteriorated. Thereby, a short duration for the low-speed performance and a long duration for the high-speed performance should be set by experiment. For example the short duration may be approximately 180-210 degrees and the long duration may be approximately 240-250 degrees.

Thereby, the exhaust two-stage VVD device 50 may apply the short duration or long duration to the exhaust valve by switching.

The exhaust continuous variable valve timing (CVVT) device 55 controls opening and closing timing of the exhaust valve of the engine according to a signal from the controller 30.

The controller 30 may classify a plurality of control regions depending on an engine speed and an engine load based on signals from the data detector 10 and camshaft position sensor 20, and control the intake CVVD and CVVT devices 40 and 45, and the exhaust two-stage VVD and CVVT devices 50 and 55 according to the control regions. Here, the plurality of control regions may be classified into six control regions.

The controller 30 applies a maximum duration to the intake valve and applies the long duration to the exhaust valve to limit a valve overlap in the first control region, applies the maximum duration to the intake and applies the long duration to the exhaust valves in order to control the control overlap according to the engine load in the second control region, applies the long duration to the exhaust valve and advances an intake valve closing (IVC) timing in the third control region, applies the short duration to the exhaust valve and controls the intake valve closing (IVC) timing close to a bottom dead center in the fourth control region, controls a wide open throttle valve (WOT) and applies the short duration to the exhaust valve to generate scavenging in the fifth control region, and controls a wide open throttle valve (WOT) and controls the intake valve closing (IVC) timing by applying the long duration to the exhaust valve to reduce knocking in the sixth control region.

For these purposes, the controller 30 may be implemented as at least one processor that is operated by a predetermined program, and the predetermined program may be programmed in order to perform each step of a method for controlling valve timing of a continuous variable valve duration engine according to the present disclosure.

Various forms described herein may be implemented within a recording medium that may be read by a computer or a similar device by using software, hardware, or a combination thereof, for example.

The hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
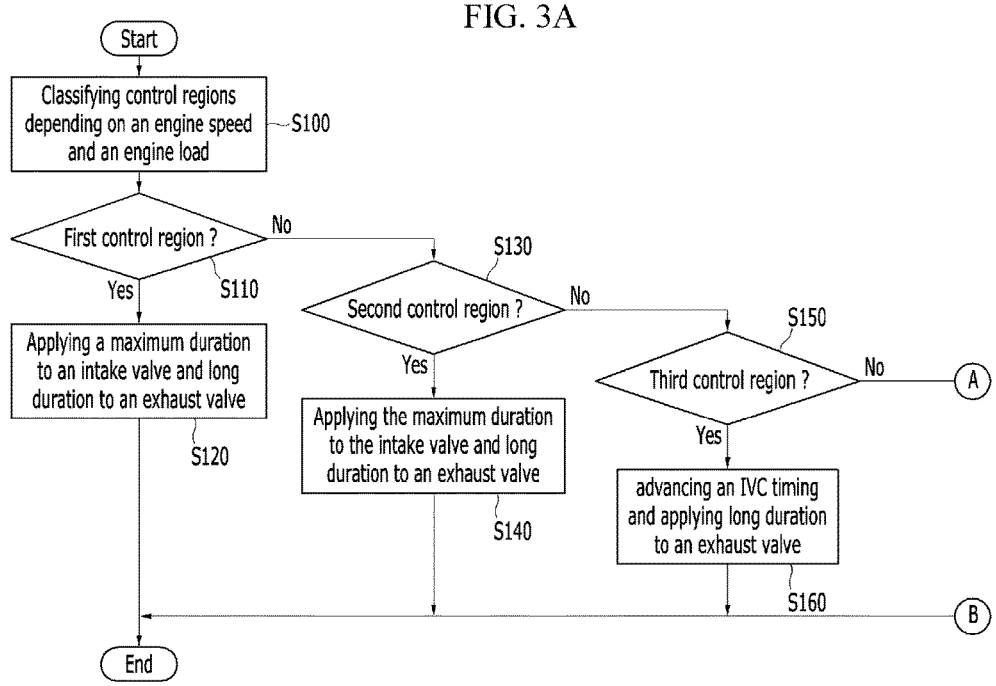
FIG. 3A and FIG. 3B are flowcharts showing a method for controlling valve timing of a continuous variable valve duration engine according to one form of the present disclosure.
Figure 3B:
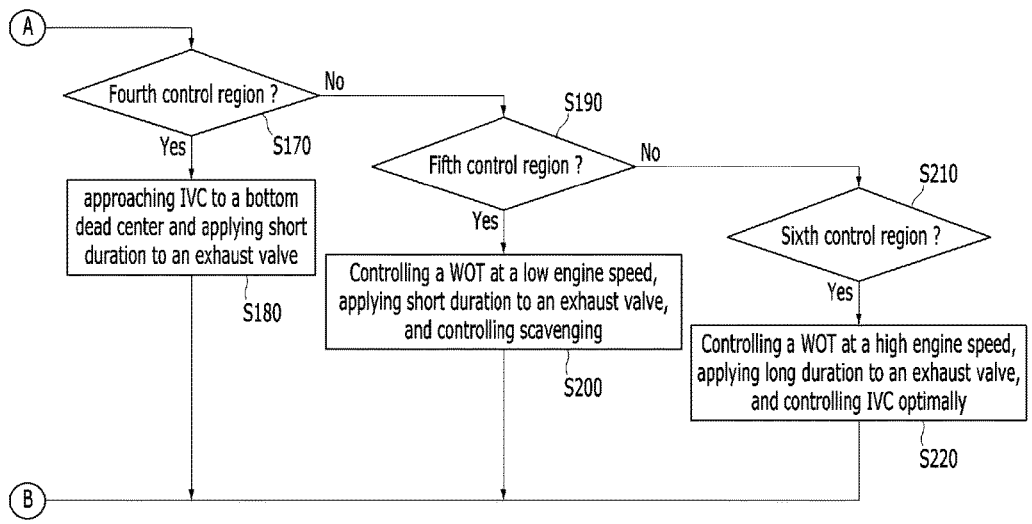

FIG. 3A and FIG. 3B are flowcharts showing a method for controlling valve timing of a continuous variable valve duration engine.

Figure 4A:
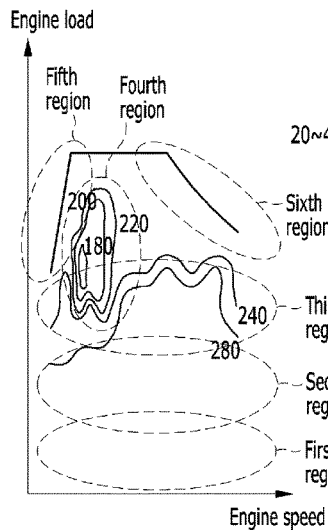
FIGS. 4A-4C are graphs showing duration, opening timing, and closing timing of an intake valve depending on an engine load and an engine speed according to the present disclosure.
Figure 4B:
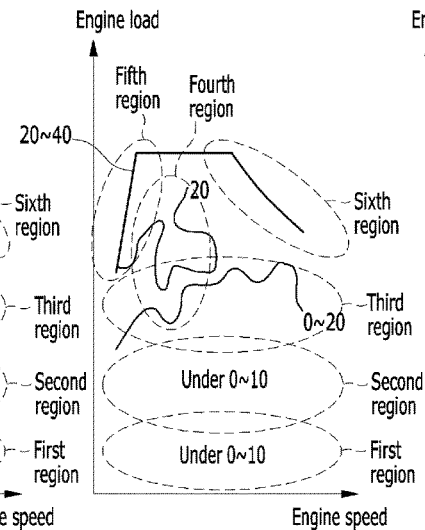
Figure 4C:
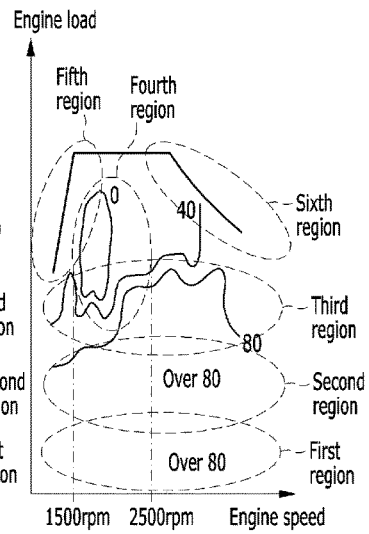
Figure 5A:
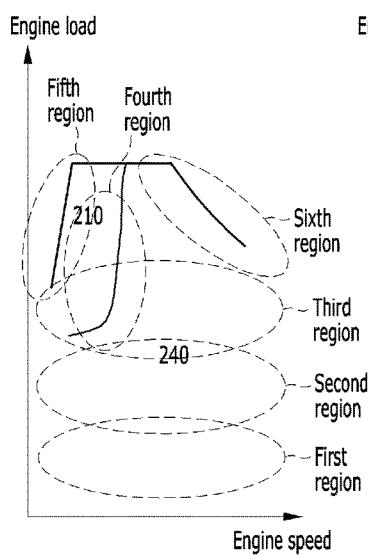
FIGS. 5A-5C are graphs showing duration, opening timing, and closing timing of an exhaust valve depending on an engine load and an engine speed according to the present disclosure.
Figure 5B:
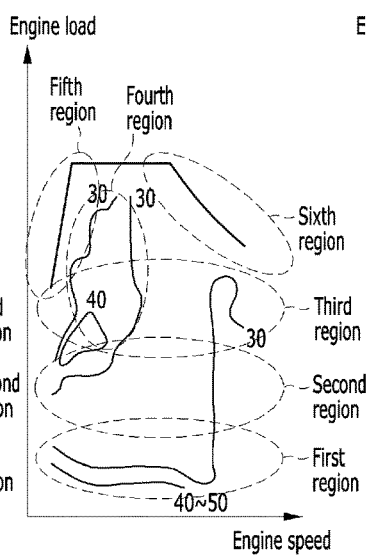
Figure 5C:
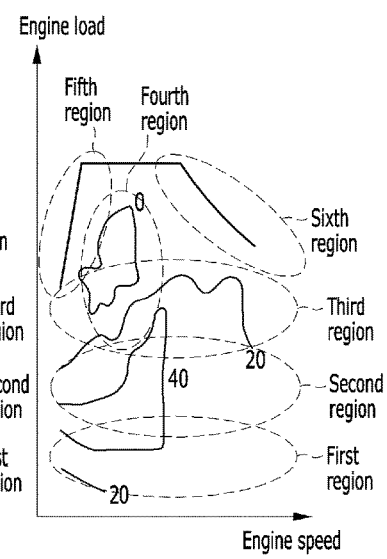

FIGS. 4A-4C are graphs showing duration, opening timing, and closing timing of an intake valve depending on an engine load and an engine speed, and FIGS. 5A-5C are graphs showing duration, opening timing, and closing timing of an exhaust valve depending on an engine load and an engine speed.

As shown in FIG. 3A and FIG. 3B, a method for controlling valve timing of a continuous variable valve duration engine starts with classifying a plurality of control regions depending on an engine speed and an engine load by the controller 30 at step S100.

The control regions will be described with reference to FIGS. 4A-4C and FIGS. 5A-5C. The first to sixth control regions are indicated in the FIG. 4A to FIG. 5C.

The controller 30 may classify control regions as a first control region when the engine load is less than a first predetermined load, a second control region when the engine load is greater than or equal to the first predetermined load and less than a second predetermined load, and a third control region when the engine load is greater than or equal to the second predetermined load and less than a third predetermined load. In addition, the controller 30 may classify control regions as a fourth region when the engine load is greater than or equal to the second predetermined load and the engine speed is greater than or equal to a first predetermined speed and less than a second predetermined speed, a fifth region when the engine load is greater than or equal to the third predetermined load and the engine speed is less than the first predetermined speed, and a sixth region when the engine load is greater than or equal to the third predetermined load and the engine speed is greater than or equal to the second predetermined speed.

Meanwhile, referring to FIGS. 4A-4C and FIGS. 5A-5C, a crank angle is marked in an intake valve duration (IVD) map and an exhaust valve duration (EVD) map, which indicating the opening time of the intake valve and exhaust valve. For example, regarding the IVD map in FIG. 4A, a curved line written as a number 200 at inner side of the fourth region means that the crank angle is approximately 200 degrees, a curved lined marked as a number 220 at outer side of the number 200 means that the crank angle is approximately 220 degrees. Although not shown in the drawing, the crank angle which is approximately more than approximately 200 degrees and less than approximately 220 degrees is positioned between the curved line of the number 200 and the curved line of the number 220.

In addition, a unit of number designated in an intake valve opening (IVO) timing map is before a top dead center (TDC), a unit of number designated in an intake valve closing (IVC) timing map is after a bottom dead center (BDC), a unit of number designated in an exhaust valve opening (EVO) timing map is before BDC, and a unit of number designated in an exhaust valve closing (EVC) map is after TDC.

Each region and curved line in FIG. 4A to FIG. 5C are one form of the present disclosure, it may be modified within the technical idea and scope of the present disclosure.

Referring to FIGS. 3A to 5C, the control regions are classified according to the engine speed and load in the step of S100. After that, the controller 30 determines whether the engine state is under the first control region at step S110.

In the step of S110, if the engine load is less than a first predetermined load, the controller 30 determines that the engine state is under the first control region. At this time, the controller 30 applies a maximum duration to the intake valve and applies the long duration to the exhaust valve to control a valve overlap between the exhaust valve and intake valve at step S120. The valve overlap is a state where the intake valve is opened and the exhaust valve is not closed yet.

In other words, when the engine is under low load, then the controller 30 may control both the intake valve opening (IVO) timing and the intake valve closing (IVC) timing being fixed such that the intake valve has a maximum duration value. As shown in FIGS. 4A-4C, the first control region may be approximately 0 to 10 degrees before TDC in the IVO timing map and approximately 100 to 110 degrees after BDC in the IVC timing map.

Also, the controller 30 may control the EVO timing to be fixed and set up the EVC timing. Meanwhile, as the valve overlap is increased, the fuel consumption is cut, whereas the combustion stability is deteriorated. Accordingly, properly setting the valve overlap is desired. However, according to the present disclosure, it is possible to get highly improved fuel-efficiency by setting desired valve overlap up, which fixing the EVO timing and controlling the EVC timing to be set up at a maximum value within sustainable combustion stability. The timing value may be determined by a predetermined map.

For example, as shown in FIGS. 5A-5C, the EVO timing may be fixed at approximately 40 to 50 degrees before BDC, the EVC timing may be established by moving the degrees thereof in an after TDC direction. The EVC timing may be a maximum value such that the combustion stability is sustainable.

When the current engine state does not belong to the first control region at the step S110, the controller 30 determines whether the current engine state belongs to the second control region at step S130.

In the step of S130, if the engine load is more than or equal to the first predetermined load and less than the second predetermined load, the controller 30 determines that the engine state is under the second control region. At this time, controller 30 applies the maximum duration to the intake valve and applies the long duration to the exhaust valve in order to control the control overlap according to the engine load at step S140.

The controller 30 may control EVC timing to be late in a direction after a top dead center as the engine load reaches a predetermined load, thereby the control overlap may be increased.

Herein, the intake pumping is decreased as the EVC timing is controlled to be late in a direction after the top dead center, however the exhaust pumping is increased as the EVO timing approaches to the bottom dead center. Therefore, the controller 30 controls the increased control overlap to be shorten by advancing the EVC timing to the locking position when the engine load is increased more than the predetermined load.

In addition, the controller 30 may control the IVC timing at the LIVC position (Late Intake Valve Closing; an angle of approximately 100-110 degrees after BDC) by applying a maximum duration to the intake valve in order to inhibit or prevent from the knocking as the engine load is increased When the current engine state does not belong to the second control region at the step S130, the controller 30 determines whether the current engine state belongs to the third control region at step S150.

In the step of S150, if the engine load is more than or equal to the second predetermined load and less than the third predetermined load, the controller 30 determines that the engine state is under the third control region. At this time, controller 30 applies the long duration to the exhaust valve and advances an intake valve closing (IVC) timing at step S160.

The IVC timing is controlled at the LIVC position (Late Intake Valve Closing; an angle of approximately 100-110 degrees after BDC, referring to FIGS. 4A-4C) in the first and second control regions. By the way, since the IVC timing is retarded at the LIVC position, the average pressure in the intake manifold (boost pressure) may be increased and the knocking is generated as the engine load is increased. Accordingly, the fuel efficiency may be deteriorated. Therefore, the controller 30 advances the IVC timing to inhibit or prevent effect as described above in the third control region which has relatively higher load.

At this time, the controller 30 may rapidly advance the IVC timing close to BDC when the engine speed is less than the predetermined speed so as to reflect characteristic of the turbo engine, as shown in FIGS. 4A-4C. In addition, if the engine speed is greater or equal to the predetermined speed, the controller 30 may slowly advance the IVC timing at an angle of approximately 30-50 degrees after BDC because the boost pressure is relatively lower. The predetermined speed may be approximately 1500 rpm.

As shown in FIGS. 5A-5C, the long duration is applied to the exhaust valve of both the second control region and the third control region. The long duration of exhaust valve may be set at approximately 240-250 so as to decrease exhaust pumping and increase the control overlap.

When the current engine state does not belong to the third control region at the step S150, the controller 30 determines whether the current engine state belongs to the fourth control region at step S170.

If the engine state is under the fourth control region in the S170, the controller 30 applies the short duration to the exhaust valve and controls the intake valve closing (IVC) timing close to the bottom dead center at step S180.

The fourth control region may be a low boost region that the engine load is greater than or equal to the second predetermined load and the engine speed is greater than or equal to the first predetermined speed and less than the second predetermined speed. For example, the first predetermined speed may be approximately 1500 rpm, and the second predetermined speed may be approximately 2500 rpm.

The controller 30 controls the IVC timing close to BDC due to improving fuel efficiency in the fourth region, which is in the low boost region. In addition, the controller 30 may shorten the valve overlap between the intake valve and the exhaust valve and improve the combustion stability by approaching the IVO timing and EVC timing close to the TDC. For this purpose, controller 30 may apply the short duration to the exhaust valve instead of the long duration.

Resultantly, the short duration (e.g., approximately 180 degrees) may be applied to the intake and exhaust valve in the fourth control region.

When the current engine state does not belong to the fourth control region at the step S170, the controller 30 determines whether the current engine state belongs to the fifth control region at step S190.

In the S190, if the engine load is greater than or equal to the third predetermined load and the engine speed is greater than or equal to the first predetermined speed, then the controller 30 determines that the engine state is under the fifth control region. At this time, controller 30 controls a wide open throttle valve (WOT) and applies the short duration to the exhaust valve to generate scavenging at step S200.

In the turbo engine, if the throttle valve is controlled to be wide open (WOT) when the engine speed is less than the first predetermined speed (e.g., 1500 rpm), intake port pressure becomes higher than exhaust port pressure by boosting. Therefore, an effect of a scavenging phenomenon which emits combustion gas of the exhaust is prominent in the turbo engine compared to a natural aspirated engine.

Accordingly, as shown in FIGS. 4A-4C, the controller 30 may advance the IVO timing at an angle of approximately 20-40 degrees before BDC to generate the scavenging, and control the IVC timing at angle of approximately 0-20 degrees after BDC.

Moreover, as shown in FIGS. 5A-5C, the controller 30 may sufficiently retard the EVO timing to after BDC so as to maximally generate the scavenging by reducing interference of exhaust. Furthermore, the EVC timing may be controlled within an angle of approximately 30 degrees after TDC in order to maintain catalyst temperature. Accordingly, the short duration is applied to the exhaust valve in the fifth control region.

When the current engine state does not belong to the fifth control region at the step S190, the controller 30 determines whether the current engine state belongs to the sixth control region at step S210.

In the step of S210, if the engine load is greater than or equal to the third predetermined load and the engine speed is greater than or equal to the second predetermined speed, then the controller determines the engine state is under the sixth control region. At this time, controller 30 controls a wide open throttle valve (WOT), controls the intake valve closing (IVC) timing by applying the long duration to the exhaust valve so as to reduce exhaust pumping and knocking by lowering the boost pressure at step S220.

When the engine speed is greater than the second predetermined speed (e.g., approximately 2500 rpm) in the sixth control region, the scavenging phenomenon disappears because exhaust port pressure is much higher than intake port pressure. Therefore, as shown in FIGS. 5A-5C, the controller 30 advances the EVO timing an angle of approximately 30 degrees before BDC and approaches the EVC timing close to the TDC to inhibit or prevent an exhaust pumping. At this time, the controller 30 may apply the long duration to the exhaust valve instead of the short duration which is used in the fifth control region by switching.

Meanwhile, when WOT control is performed at a high speed condition, knocking is rarely generated in the natural aspirated engine, on the contrary, knocking may be deteriorated in the turbo engine. Thus, as shown in FIGS. 4A-4C, the controller 30 may advance the IVC timing within an angle of approximately 50 degrees after BDC to reduce knocking by decreasing boost pressure.

As described above, duration and timing of the continuous variable valve are simultaneously controlled, so the engine may be controlled under desired conditions.

That is, since opening timing and closing timing of the intake valve and the exhaust valve are appropriately controlled, the fuel efficiency under a partial load condition and engine performance under a high load condition are improved. In addition, a starting fuel amount may be reduced by increasing a valid compression ratio, and exhaust gas may be reduced by shortening time for heating a catalyst.

In addition, the cost reduction and power performance may be realized by providing the two-stage VVD device to the exhaust valve side.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A method for controlling valve timing of a turbo engine provided with a continuous variable valve duration (CVVD) device and a continuous variable valve timing (CVVT) device disposed on an intake valve side, and provided with a two-stage variable valve duration (VVD) device and a continuous variable valve timing (CVVT) device disposed on an exhaust valve side, the method comprising:
   classifying, by a controller, a plurality of control regions depending on an engine speed and an engine load,
   wherein the plurality of control regions comprises:
      a first control region determined by the controller when the engine load is less than a first predetermined load,
      a second control region determined by the controller when the engine load is greater than or equal to the first predetermined load and less than a second predetermined load,
      a third control region determined by the controller when the engine load is greater than or equal to the second predetermined load and less than a third predetermined load,
      a fourth control region when the engine load is greater than or equal to the second predetermined load and the engine speed is greater than or equal to a first predetermined speed and less than a second predetermined speed,
      a fifth control region when the engine load is greater than or equal to the third predetermined load and the engine speed is less than the first predetermined speed, and
      a sixth control region when the engine load is greater than or equal to the third predetermined load and the engine speed is greater than or equal to the second predetermined speed;

applying, by the controller, a maximum duration to an intake valve and applying a first duration to an exhaust valve to control a valve overlap between the exhaust valve and the intake valve in the first control region;

applying, by the controller, the maximum duration to the intake valve and applying the first duration to the exhaust valve so as to control a control overlap according to an engine load in the second control region;

applying, by the controller, the first duration to the exhaust valve and advancing an intake valve closing (IVC) timing in the third control region;

applying, by the controller, a second duration to the exhaust valve and controlling the intake valve closing (IVC) timing close to a bottom dead center in the fourth control region, wherein the second duration is set to be shorter than the first duration;

controlling, by the controller, a wide open throttle valve (WOT) and applying the second duration to the exhaust valve to generate scavenging in the fifth control region; and controlling, by the controller, a wide open throttle valve (WOT) and controlling the intake valve closing (IVC) timing by applying the first duration to the exhaust valve so as to reduce a knocking in the sixth control region.

2. The method of claim 1, wherein, when the first control region is determined, the controller controls an intake valve opening (IVO) timing, the intake valve closing (IVC) timing, and an exhaust valve opening (EVO) to be fixed and an exhaust valve closing (EVC) timing to be set up at a maximum value within sustainable combustion stability.

3. The method of claim 1, wherein, when the second control region is determined, the controller controls an exhaust valve closing (EVC) timing to be retard as the engine load is increased so as to increase the valve overlap, and after when the engine load is greater than or equal to a predetermined reference load, the controller controls the exhaust valve closing (EVC) timing to be advanced to decrease the valve overlap.

4. The method of claim 1, wherein, when the third control region is determined, the controller advances the intake valve closing (IVC) timing close to a bottom dead center when the engine speed is less than a predetermined reference speed, the controller advances the intake valve closing (IVC) timing to after the bottom dead center when the engine speed is greater than or equal to the predetermined reference speed.

5. The method of claim 1, wherein, when the fourth control region is determined, the controller controls an intake valve opening (IVO) timing and an exhaust valve closing (EVC) to approach at a top dead center so as to reduce the valve overlap.

6. The method of claim 1, wherein, when the fifth control region is determined, the controller advances an intake valve opening (IVO) timing to before a top dead center to generate the scavenging and controls the intake valve closing (IVC) timing to after the bottom dead center.

7. The method of claim 1, wherein, when the fifth control region is determined, the controller retards an exhaust valve opening (EVO) timing to after a bottom dead center so as to reduce interference of exhaust and controls an exhaust valve closing (EVC) timing to after a top dead center to maintain a catalyst temperature.

8. The method of claim 1, wherein, when the sixth control region is determined, the controller advances an exhaust valve opening (EVO) timing to before a bottom dead center to inhibit an exhaust pumping and to lower boost pressure, and the controller controls an exhaust valve closing (EVC) timing to be close to a top dead center.

9. A system for controlling valve timing of a continuous variable valve duration engine provided with a turbo charger, the system comprising:
a data detector configured to detect data related to a running state of a vehicle;
a camshaft position sensor configured to detect a position of a camshaft;
an intake continuous variable valve duration (CVVD) device configured to control an opening time of an intake valve of the engine;
an exhaust two-stage variable valve duration (VVD) device configured to control an opening time of an exhaust valve of the engine;
an intake continuous variable valve timing (CVVT) device configured to control an opening and closing timing of the intake valve of the engine;
an exhaust continuous variable valve timing (CVVT) device configured to control an opening and closing timing of the exhaust valve of the engine; and
a controller configured to classify a plurality of control regions depending on an engine speed and an engine load based on signals from the data detector and camshaft position sensor, and configured to control the intake CVVD and CVVT devices, and the exhaust two-stage VVD and CVVT devices according to the plurality of control regions,
wherein the plurality of control regions comprises:
a first control region determined by the controller when the engine load is less than a first predetermined load,
a second control region determined by the controller when the engine load is greater than or equal to the first predetermined load and less than a second predetermined load,
a third control region determined by the controller when the engine load is greater than or equal to the second predetermined load and less than a third predetermined load,
a fourth region determined by the controller when the engine load is greater than or equal to the second predetermined load and the engine speed is greater than or equal to a first predetermined speed and less than a second predetermined speed,
a fifth region determined by the controller when the engine load is greater than or equal to the third predetermined load and the engine speed is less than the first predetermined speed, and
a sixth region when the engine load is greater than or equal to the third predetermined load and the engine speed is greater than or equal to the second predetermined speed, and
wherein the controller applies a maximum duration to the intake valve and applies a first duration to the exhaust valve to limit a valve overlap in the first control region, applies the maximum duration to the intake and applies the first duration to the exhaust valves so as to control a control overlap according to the engine load in the second control region, applies the first duration to the exhaust valve and advances an intake valve closing (IVC) timing in the third control region, applies a second duration to the exhaust valve and controls the intake valve closing (IVC) timing close to a bottom dead center in the fourth control region, controls a wide open throttle valve (WOT) and applies the second duration to the exhaust valve to generate scavenging in the fifth control region, and controls a wide open throttle valve (WOT) and controls the intake valve closing (IVC) timing by applying the first duration to the exhaust valve to reduce knocking in the sixth control region, wherein the second duration is shorter than the first duration.

10. The system of claim 9, wherein the controller controls an intake valve opening (IVO) timing, the intake valve closing (IVC) timing, and an exhaust valve opening (EVO) to be fixed and an exhaust valve closing (EVC) timing to be set up at a maximum value within sustainable combustion stability in the first region.

11. The system of claim 9, wherein the controller controls an exhaust valve closing (EVC) timing to be retard as the engine load is increased so as to increase the valve overlap, when the engine load is greater than or equal to a predetermined reference load, the controller controls the exhaust valve closing (EVC) timing to be advanced so as to decrease the valve overlap in the second control region.

12. The system of claim 9, wherein the controller advances the intake valve closing (IVC) timing to be close to a bottom dead center when the engine speed is less than a predetermined reference speed, the controller advances the intake valve closing (IVC) timing to after the bottom dead center when the engine speed is greater than or equal to the predetermined reference speed in the third control region.

13. The system of claim 9, wherein the controller controls an intake valve opening (IVO) timing and an exhaust valve closing (EVC) to approach at a top dead center so as to reduce the valve overlap in the fourth control region.

14. The system of claim 9, wherein the controller advances an intake valve opening (IVO) timing to before a top dead center to generate the scavenging and controls the intake valve closing (IVC) timing to after a bottom dead center in the fifth control region.

15. The system of claim 9, wherein the controller retards an exhaust valve opening (EVO) timing to after a bottom dead center so as to reduce interference of exhaust and controls an exhaust valve closing (EVC) timing to after a top dead center to maintain a catalyst temperature in the fifth control region.

16. The system of claim 9, wherein the controller advances an exhaust valve opening (EVO) timing to before a bottom dead center to inhibit an exhaust pumping and to lower boost pressure, and the controller controls an exhaust valve closing (EVC) timing to be close to a top dead center in the sixth control region.

* * * * *